Oct. 25, 1960
S. LE ROY LEWIS
2,957,740
OUTLET BOX APPLIANCE HOLDER
Filed June 4, 1957
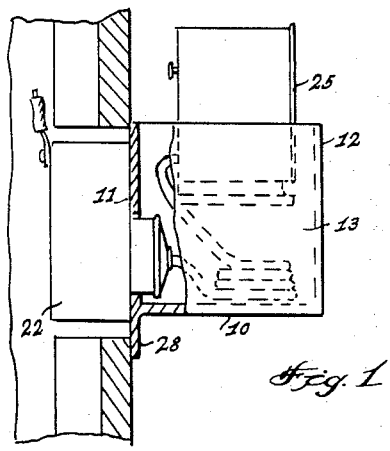
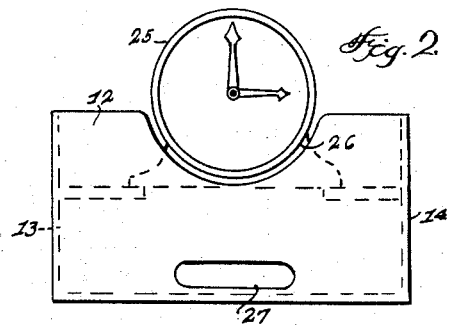
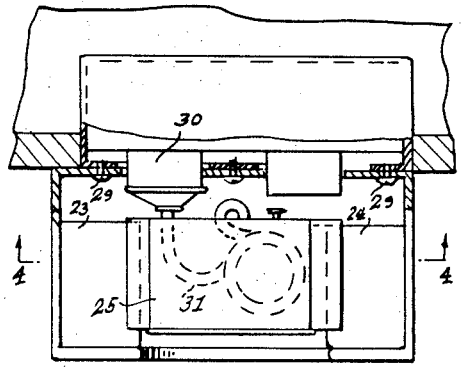
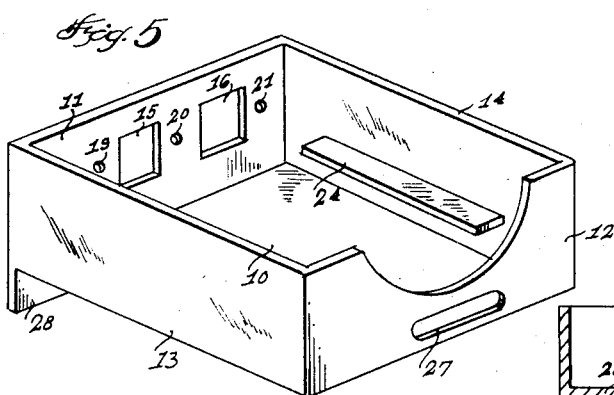
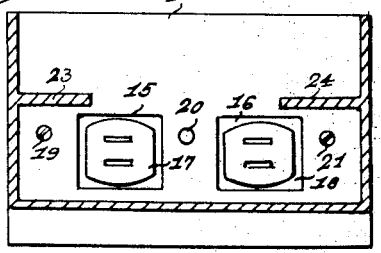
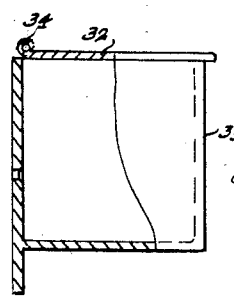
INVENTOR.
SIDNEY LE REROY LEWIS
BY *Victor J. Evans + Co.*
ATTORNEYS

United States Patent Office 2,957,740
Patented Oct. 25, 1960

2,957,740

OUTLET BOX APPLIANCE HOLDER

Sidney Le Roy Lewis, 40 Lowell St., Rochester, N.H.

Filed June 4, 1957, Ser. No. 663,418

3 Claims. (Cl. 312—245)

This invention relates to supports for electrical appliances, and in particular a wall bracket attached to a conventional electric outlet or wall box wherein an appliance, such as an electric razor or clock may be positioned in or on the bracket with the cord hidden in the lower part of the bracket and wherein a plug on the end of the appliance cord remains in the wall socket continuously.

By this means valuable space, particularly in small apartments is saved, or made available for other uses.

The purpose of this invention is to provide means for supporting an electric appliance on the surface of a wall and particularly in close proximity to a wall outlet box.

In numerous instances, and particularly where electric clocks are positioned on the wall of a kitchen it is necessary to carry electric cords over the wall and unless the cord is of the same color as that of the wall it presents an unsightly appearance. Also, in numerous instances, such as with an electric razor where the appliance is used continuously it is necessary to withdraw the plug from the socket, wrap the cord around the appliance and place the appliance in a cabinet or the like so that considerable time is lost. With this thought in mind this invention contemplates a relatively small bracket, shelf, or holder that is attached in place of the conventional face plate of a wall socket whereby an appliance, such as an electric razor or clock may be removed from the device, used, and readily replaced in a comparatively few minutes.

The object of this invention is, therefore, to provide a support for an eelctric appliance in which the support is permanently in position on the face of a wall and over an electric outlet or box.

Another object of the invention is to provide an electric appliance holder that is readily attached to an electric outlet or wall box by using screws in the same threaded openings that screws for holding the face plate are normally positioned.

A further object of the invention is to provide a holder for electrical appliances and the like that is adapted to be attached to an outlet or wall socket in which the holder is of a simple and economical construction.

With these and other objects and advantages in view the invention embodies a tray or open box having a base, front and rear walls and end walls and in which openings are provided in a rear wall to correspond with electrical sockets of an outlet or wall box and also in which openings for screws are provided so that screws may be placed into the housing of the outlet box for supporting the tray in an extended position.

Other features and advantages of the invention will appear from the following description taken in connection with the drawing, wherein:

Figure 1 is a side elevational view of the improved outlet box appliance holder showing the device attached to a wall outlet box with one end of the holder broken away and with a wall upon which the device is positioned shown in section.

Figure 2 is a front elevational view of the support showing a clock positioned therein.

Figure 3 is a sectional plan through the outlet box appliance holder showing the device attached, such as by screws, to a wall outlet box.

Figure 4 is a longitudinal section through the bracket taken on line 4—4 of Fig. 3 showing ledges for supporting an appliance, such as a clock and also showing openings for electrical sockets in the rear wall.

Figure 5 is a perspective view of the holder showing openings in a rear wall providing access to the socket elements and also showing one of the appliance or clock supporting elements.

Figure 6 is a side elevational view with part broken away showing a modification wherein a cover is hinged to the bracket.

Referring now to the drawing wherein like reference characters denote corresponding parts the improved electric appliance holder of this invention includes a base 10 having a rear wall 11, a front wall 12 and end walls 13 and 14 extended upwardly therefrom and, as shown in Fig. 4 the rear wall 11 is provided with spaced openings 15 and 16 that are positioned to register with sockets 17 and 18 of a wall outlet box and also openings 19, 20 and 21 that are positioned to register with screw receiving openings in the outlet box 22 in which screws for retaining a conventional face plate on the box are positioned.

The end walls 13 and 14 are also provided with ledges or shelves 23 and 24 that extend inwardly from inner surfaces of the walls to provide supporting means for a clock, as indicated by the numeral 25.

The front wall 12 is also provided with an arcuate recess 26 to provide clearance for the lower part of the clock and the lower part of the wall is provided with an opening 27 through which an electric cord may be placed.

The lower edge of the rear wall 11 is provided with a depending flange 28 that provides a support for retaining the holder in a horizontally disposed position.

A cover 32 may be provided for the holder 33 and the cover is attached to the rear wall 11 by hinges 34.

With the parts positioned as illustrated and described the device is mounted on an electrical outlet or wall box, such as the box 22 with screws 29 extended through the openings 19, 20 and 21 and threaded into the outlet box and with the holder in position a plug 30 on the end of a cord 31 of an appliance, such as the clock 25 is inserted in one of the sockets through one of the openings 15 or 16 and with the cord placed in the lower part of the holder a clock is positioned on the ledges 23 and 24 whereby the clock is supported in a convenient position for use, as shown in Fig. 2 and the cord is substantially hidden.

Although the device is described as being particularly adapted for holding electric razors and clocks it will be understood that other appliances may be supported in the bracket and the bracket may be provided in different types and designs.

The outlet box appliance holder saves space by providing means for holding a clock, or other device on the face of a wall, space on shelves, cabinets and the like, normally occupied by such devices, can be used for other purposes.

It will be understood that modifications, within the scope of the appended claims, may be made in the design and arrangement of the parts without departing from the spirit of the invention.

What is claimed is:

1. An electric appliance holder comprising a base having front, rear, and end walls extended upwardly therefrom, said rear wall having square shaped plug receiving openings and screw receiving openings therein, the plug receiving openings being positioned in registering relation with plug receiving sockets of an outlet box the screw receiving openings in registering relation with screw receiving openings of the face plate of a conventional outlet box with the transverse axes of the plug receiving openings being in horizontal alinement with each other, the end walls having inwardly extended ledges on inner surfaces thereof for supporting an appliance, and a cover hinged to the upper edge of the wall.

2. An appliance holder comprising a base having front, rear, and end walls extended upwardly therefrom, said rear wall having square shaped plug receiving openings and screw receiving openings therein, the plug receiving openings being positioned in registering relation with plug receiving sockets of an outlet box and the screw receiving openings in registering relation with the screw receiving openings of the face plate of an outlet box with the transverse axes of the plug receiving openings and the screw receiving openings being in horizontal alinement with each other, shelves extended between the walls of the box and spaced downwardly from the upper ends thereof, and a panel extended downwardly from the lower edge of said rear wall.

3. In an electrical appliance holder, the combination which comprises a boxlike casing having a base with vertically disposed rear, front and end walls extended upwardly therefrom, the rear wall having a depending flange for supporting the holder in an outwardly extended position, said rear wall also having square shaped plug receiving openings and screw receiving openings therethrough with the openings in registering relation with corresponding parts of a conventional wall outlet box with the transverse axes of the plug receiving openings and the screw receiving openings being in horizontal alinement with each other, the front wall having an arcuate recess positioned in the upper edge and an opening extended through the lower part and said end walls having shelves extended inwardly therefrom and spaced downwardly from the upper edge of the holder.

References Cited in the file of this patent

UNITED STATES PATENTS

| | | |
|---|---|---|
| 865,475 | Belisle | Sept. 10, 1907 |
| 1,441,040 | Stephenson | Jan. 2, 1923 |
| 2,148,043 | Zero | Feb. 21, 1939 |
| 2,231,001 | Engstrom | Feb. 11, 1941 |
| 2,486,932 | Elliott | Nov. 1, 1949 |
| 2,744,716 | Zingone | May 8, 1956 |
| 2,821,453 | Jessen | Jan. 28, 1958 |

FOREIGN PATENTS

| | | |
|---|---|---|
| 38,982 | Switzerland | Feb. 8, 1907 |